(12) United States Patent
An et al.

(10) Patent No.: US 11,226,590 B2
(45) Date of Patent: Jan. 18, 2022

(54) HOLOGRAPHIC DISPLAY AND OPERATING METHOD THEREOF

(71) Applicant: SAMSUNG ELECTRONICS CO., LTD., Suwon-si (KR)

(72) Inventors: Jungkwuen An, Suwon-si (KR); Hoon Song, Yongin-si (KR); Sunil Kim, Seoul (KR); Hongseok Lee, Seoul (KR); Joonyong Park, Suwon-si (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 15/819,485

(22) Filed: Nov. 21, 2017

(65) Prior Publication Data

US 2018/0181065 A1    Jun. 28, 2018

(30) Foreign Application Priority Data

Dec. 23, 2016   (KR) ......................... 10-2016-0177943

(51) Int. Cl.
*G03H 1/22*   (2006.01)
*G03H 1/00*   (2006.01)
*G03H 1/08*   (2006.01)
*G03H 1/28*   (2006.01)

(52) U.S. Cl.
CPC ......... *G03H 1/2294* (2013.01); *G03H 1/0005* (2013.01); *G03H 1/0866* (2013.01); *G03H 1/2205* (2013.01); *G03H 1/2286* (2013.01); *G03H 1/28* (2013.01); *G03H 2001/0088* (2013.01); *G03H 2001/0883* (2013.01); *G03H 2001/221* (2013.01); *G03H 2001/2223* (2013.01); *G03H 2001/2292* (2013.01); *G03H 2223/00* (2013.01); *G03H 2225/12* (2013.01); *G03H 2225/60* (2013.01); *G03H 2226/00* (2013.01)

(58) Field of Classification Search
CPC ........... G03H 2223/00; G03H 2225/00; G03H 2226/00; G03H 1/28
See application file for complete search history.

(56) References Cited

U.S. PATENT DOCUMENTS

| 8,526,088 B2 | 9/2013 | Schwerdtner et al. |
| 9,104,177 B2 | 8/2015 | Shin |
| 2008/0007511 A1* | 1/2008 | Tsuboi ............... G02B 27/2214 345/102 |

(Continued)

FOREIGN PATENT DOCUMENTS

| KR | 10-2014-0060204 A1 | 5/2014 |
| KR | 10-1397057 B1 | 5/2014 |

*Primary Examiner* — Kyle M Lotfi
(74) *Attorney, Agent, or Firm* — Sughrue Mion, PLLC

(57) ABSTRACT

Provided are holographic displays and operating methods of the holographic display. The holographic display includes a backlight portion configured to emit light for displaying an image; a deflector configured to control a direction at which the image is displayed; a lens portion configured to control a location where the image to be displayed is formed to match a location that satisfies a diffraction condition; and a panel portion configured to display a 3D image by combining the image to be displayed with an interference pattern generated with respect to an overlapped hologram.

18 Claims, 4 Drawing Sheets

(56) References Cited

U.S. PATENT DOCUMENTS

| | | | |
|---|---|---|---|
| 2010/0079832 A1* | 4/2010 | Takiguchi | B23K 26/06 |
| | | | 359/9 |
| 2010/0296148 A1 | 11/2010 | Reichelt et al. | |
| 2013/0170004 A1 | 7/2013 | Futterer | |
| 2013/0222384 A1* | 8/2013 | Futterer | G02B 5/32 |
| | | | 345/426 |
| 2014/0101604 A1 | 4/2014 | Han et al. | |
| 2015/0205259 A1* | 7/2015 | Kim | G03H 1/2294 |
| | | | 359/9 |
| 2016/0147003 A1 | 3/2016 | Morozov et al. | |
| 2016/0103321 A1 | 4/2016 | An et al. | |
| 2018/0220127 A1* | 8/2018 | Khan | G02B 30/56 |
| 2019/0155033 A1* | 5/2019 | Gelman | G03H 1/2205 |

* cited by examiner

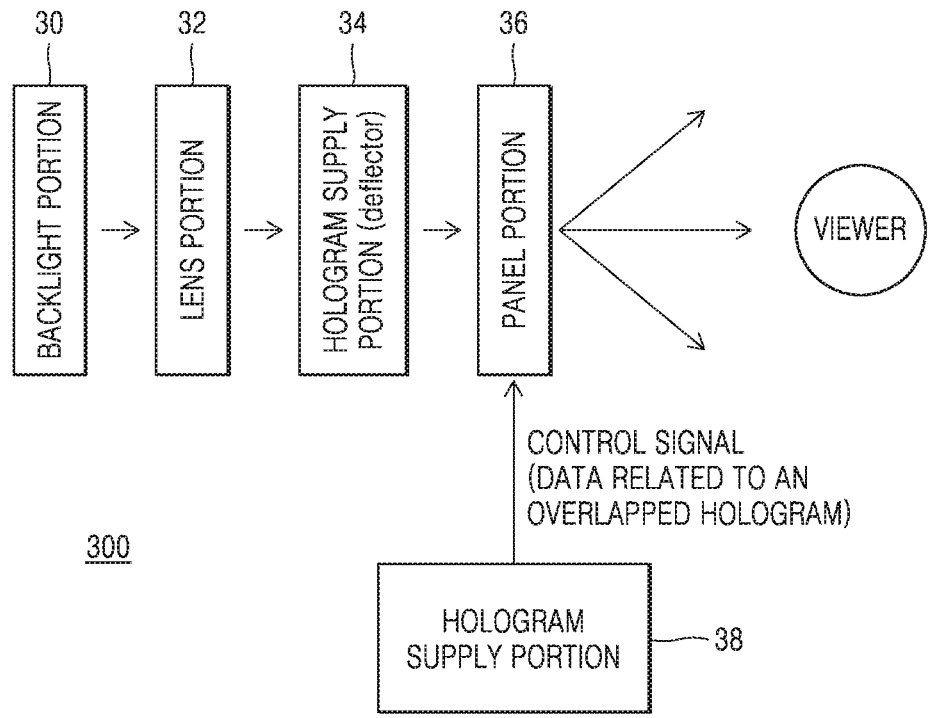
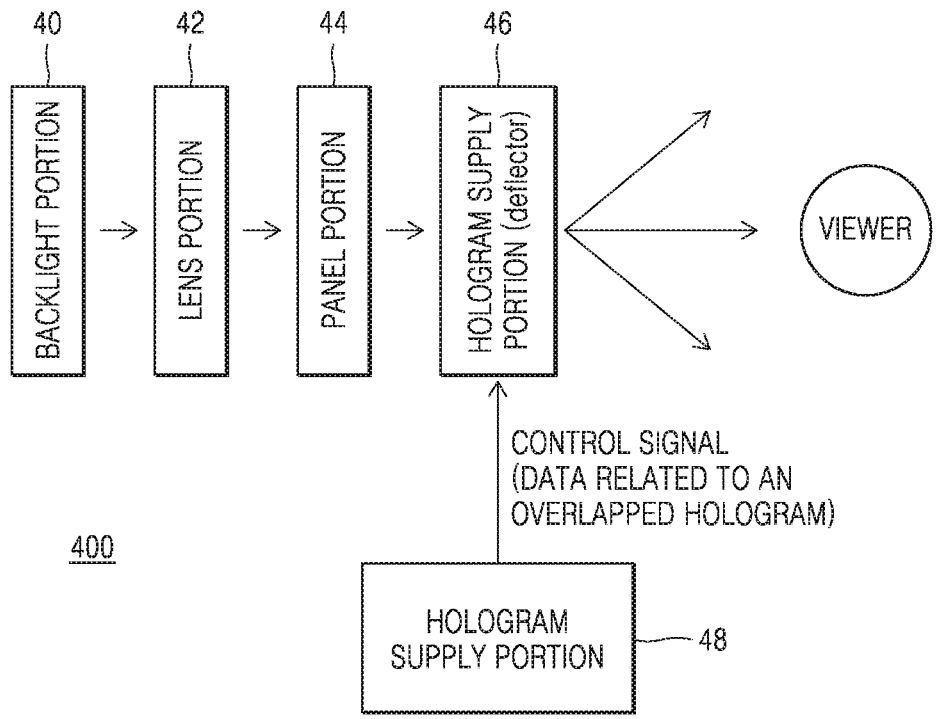

HOLOGRAPHIC DISPLAY AND OPERATING METHOD THEREOF

CROSS-REFERENCE TO RELATED APPLICATION

This application claims priority from Korean Patent Application No. 10-2016-0177943, filed on Dec. 23, 2016 in the Korean Intellectual Property Office, the disclosure of which is incorporated herein in its entirety by reference.

BACKGROUND

1. Field

Example embodiments of the present disclosure relate to displays, and more particularly, to holographic displays and operating methods thereof.

2. Description of the Related Art

Digital holography is technology which records or reproduces amplitude information and phase information of light waves using coherent light. Methods of forming a hologram by using a holography technology include a method of directly forming a hologram by using an optical element (for example, lenses, beam splitters, or mirrors, etc.) and a method of forming a hologram from a three-dimensional (3D) image having depth information by using a computer. The hologram formed by using a computer is referred to as a computer-generated hologram (CGH). A hologram formed by this method may be re-produced as a 3D image through a spatial light modulator (SLM), and thus, a viewer may view a 3D image.

SUMMARY

One or more example embodiments provide holographic displays configured to reduce or remove discontinuity of viewing of a 3D image that uses a hologram in a viewing region.

One or more example embodiments also provide operating methods of the holographic displays.

Additional aspects will be set forth in part in the description which follows and, in part, will be apparent from the description, or may be learned by practice of the presented example embodiments.

According to an example embodiment, there is provided a holographic display including: a backlight portion configured to emit light for displaying an image recorded with a hologram; a deflector configured to control a direction at which the image is displayed; a lens portion configured to control a location where the image to be displayed is formed to match a location that satisfies a diffraction condition; and a panel portion configured to display an interference pattern with respect to an overlapped hologram.

The holographic display may further include a hologram supply portion configured to supply a control signal to the panel portion so that the panel portion displays the interference pattern.

The deflector may include: a first deflector configured to deflect the image to be displayed in a horizontal direction; and a second deflector configured to deflect the image to be displayed in a vertical direction.

The deflector may include a mono-deflector configured to deflect a displayed image in a vertical direction and a horizontal direction.

The lens portion may include a variable focus lens, a refractive index of which is electrically controlled.

The holographic display may further include a non-variable focus lens provided adjacent to the variable focus lens on an optical path.

The variable focus lens may include a Fresnel lens and a liquid crystal layer covering a light emission surface of the Fresnel lens.

The panel portion may include a spatial light modulator (SLM).

The spatial light modulator (SLM) may include one of a phase SLM, an amplitude SLM, and a complex SLM.

The overlapped hologram may include: a main computer generated hologram (CGH) in which the image is recorded; and a z-scan hologram configured to move the displaying image to a location between regions that satisfy the diffraction condition.

The deflector may be provided in one of locations between the backlight portion and the panel portion, behind the backlight portion, and between the panel portion and a person viewing the 3D image.

According to an aspect of another exemplary embodiment, there is provided an operating method to operate a holographic display, the operating method including: generating an overlapped computer-generated hologram (CGH); supplying the overlapped CGH to a panel portion; and radiating light to the panel portion such that the overlapped CGH and the light combine to form a 3D image.

The generating of the overlapped CGH may include: generating a main hologram in which a three-dimensional (3D) image to be displayed through the panel portion is recorded; generating a z-scan hologram configured to move the 3D image to a region that does not satisfy a diffraction condition; and overlapping the main hologram and the z-scan hologram.

The generating of the z-scan hologram may include: finding a location of eyes of a person viewing the 3D image; calculating a focal distance from a lens portion of the holographic display to the eyes of the person; controlling a focus of the lens portion so that the controlled focus is nearest to the calculated focal distance within a focus control range of the lens portion; calculating a focus error between the calculated focal distance and the controlled focal distance of the lens portion; calculating a focal distance of a lens configured to compensate for the calculated error, wherein the lens is a compensating lens; and calculating a hologram corresponding to the compensation lens by using an equation for calculating a complex hologram.

The supplying of the overlapped CGH to the panel portion may include: generating a control signal by processing a signal for the overlapped CGH; and supplying the control signal to the panel portion.

The generating of the control signal by processing the signal for the overlapped CGH may include encoding the overlapped CGH.

The panel portion may include the spatial light modulator (SLM).

The SLM may include one of a phase SLM, an amplitude SLM, and a complex SLM.

The radiating of the light to the panel portion may include deflecting a travelling direction of the light in a given direction before the radiating the light to the panel portion.

BRIEF DESCRIPTION OF THE DRAWINGS

The above and/or other aspects will become apparent and more readily appreciated from the following description of example embodiments, taken in conjunction with the accompanying drawings in which:

FIGS. 1, 2, 3, and 4 are plan views illustrating various holographic displays according to example embodiments;

DETAILED DESCRIPTION

Figure 1:
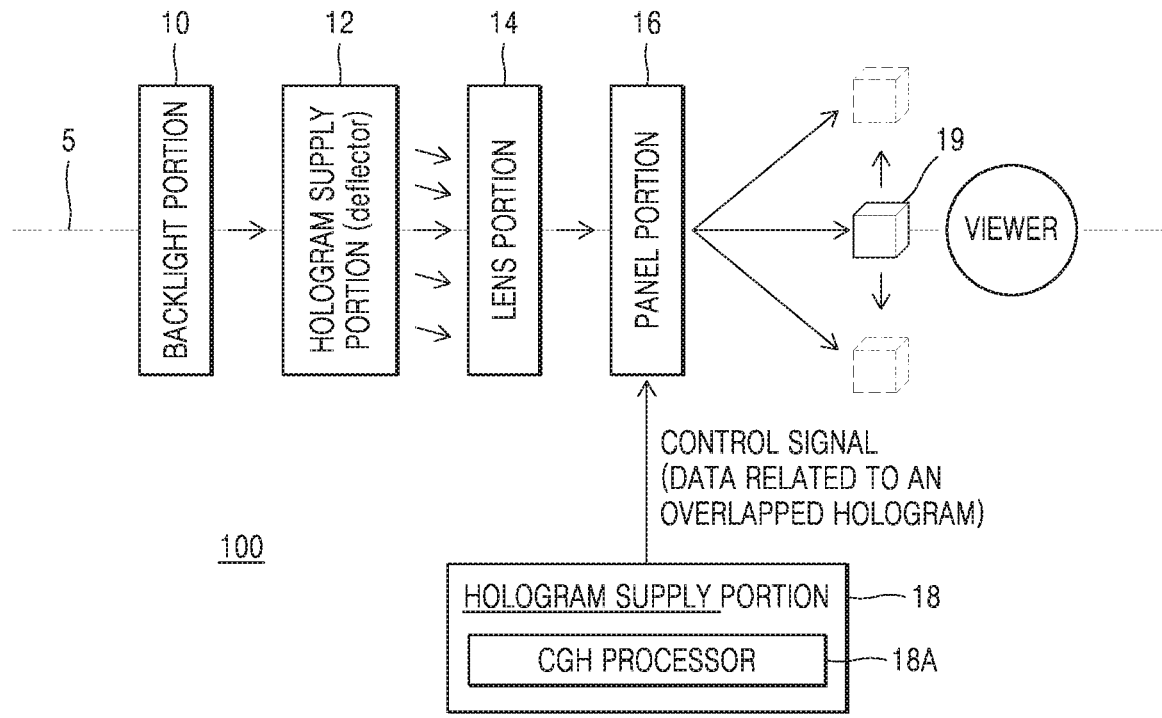

Certain example embodiments will now be described more fully hereinafter with reference to the accompanying drawings. The inventive concept may, however, be embodied in many different forms, and should not be construed as limited to the example embodiments set forth herein. Rather, these example embodiments are provided so that this disclosure will be thorough and complete, and will fully convey the scope of the inventive concept to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular exemplary embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terms "about" and "approximately" as used herein are inclusive of the stated value and mean that the stated value is within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations or within ±30%, 20%, 10%, 5%, etc. of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, holographic displays according to example embodiments and methods of operating the holographic displays will be described in detail with reference to the accompanying drawings. In the drawings, thicknesses of layers or regions are exaggerated for the clarity of the specification.

FIG. 1 is a plan view of a holographic display 100 according to an example embodiment.

Referring to FIG. 1, a holographic display 100 may include a backlight portion 10, a deflector 12, a lens portion 14, and a panel portion 16. The holographic display 100 may further include a hologram supply portion 18 that applies a control signal to the panel portion 16. The hologram supply portion 18 is configured to provide an overlapped hologram in an encoded manner to the panel portion 16. The overlapped hologram is formed by overlapping a computer-generated hologram (CGH) (hereinafter, a main CGH) in which a three-dimensional (3D) image with respect to an object is recorded and a z-scan hologram. The overlapped hologram may be supplied to the panel portion 16 as an encoded control signal. The main CGH is overlapped on the z-scan hologram and includes information (for example, an interference pattern) about a 3D image to be displayed through the panel portion 16. The main CGH may be a complex CGH. The z-scan hologram is a hologram for controlling a focus or a focal length of the lens portion 14 in a z-direction. That is, the z-scan hologram is a hologram for controlling a focus or a focal length of a variable focus lens included in the lens portion 14 in the z-direction. In detail, when a side of the panel portion 16 facing a viewer is referred to as an X-Y side, a hologram for controlling a focus or a focal length of the lens portion 14 in a direction (the z-direction) perpendicular to the side of the panel portion 16 facing the viewer is the z-scan hologram. The z-scan hologram may be referred to as a "variable focus algorithm" or a "variable focus hologram". As a result, a focal distance of the lens portion 14 may be compensated for by the z-scan hologram, which will be described below. The control signal applied to the panel portion 16 from the hologram supply portion 18 may be a data signal generated in response to a signal processing (for example, encoding) with respect to the main CGH. At this point, the data signal may be, for example, a data signal for an overlapped hologram. The hologram supply portion 18 may include a CGH processor 18A for generating a main CGH and processing a signal.

The backlight portion 10 emits a coherent light. Light emitted from the backlight portion 10 may be used as a reference light for reproducing or displaying a hologram, that is, for reproducing or displaying a 3D hologram image. The backlight portion 10 may include a laser for emitting a coherent light. The backlight portion 10 may include a mono-light source. The backlight portion 10 may include an array type light source including a plurality of mono-light sources. The backlight portion 10 may include a beam expander together with the light source. Light irradiation with respect to a surface may be performed by using the beam expander. The backlight portion 10 may include a light source used in a conventional holographic display. Light emitted from the backlight portion 10 enters the panel portion 16 by sequentially passing through the deflector 12 and the lens portion 14. Light that entered the panel portion 16 may be used as a reference light required for reproducing or displaying an image recorded with a hologram. That is, light that entered the panel portion 16 may be used as a reference light required for making a 3D image 19 from an interference pattern displayed on the panel portion 16. The deflector 12 may be arranged next to the backlight portion 10. The deflector 12 may change a direction of light incident from the backlight portion 10 by as much as a given angle in a vertical direction (an up-and-down direction) and/or a horizontal direction (a left-and-right direction). Accordingly, a focus of the lens portion 14 may be moved in the left-and-right direction and the up-and-down direction, and thus, a 3D image formed in a viewing region where a viewer is located in front of the panel portion 16 may be moved in the left-and-right direction and the up-and-down direction. For example, when light incident to the deflector 12 travels in a right direction while passing through the deflector 12 at a given angle with respect to an optical axis 5, parallel light inclined in a right direction with respect to the optical axis 5 enters the lens portion 14, and thus, a focus of the lens portion 14 moves from the optical axis 5 to the right side of the optical axis 5. This may denote that the 3D image 19 is moved to the right side of the optical axis 5.

In this manner, a travelling direction of light may be controlled by using the deflector 12, and thus, a location for viewing the 3D image 19 in the viewing region may be controlled. The lens portion 14 is arranged between the deflector 12 and the panel portion 16. The lens portion 14 may include a variable lens configured to change a focus or a focal length thereof. At this point, a focal length of the variable lens may be controlled by an electrical method, that is, by a voltage applied to the lens. The lens portion 14 may include a mono-variable focus lens. The lens portion 14 may include a mono-variable focus lens and a non-variable focus lens. The non-variable focus lens is a lens having a fixed focus or a focal length. The non-variable focus lens may include one or more lenses. The mono-variable focus lens may denote a lens which includes one variable focus lens. Also, the mono-variable focus lens may be an optical element that performs as a total variable focus lens by including a plurality of configurations including the variable focus lens and other configurations different from the variable focus lens. An example of the lens portion 14 will be described with reference to FIG. 5. The lens portion 14 produces a diffraction phenomenon. Accordingly, it may be difficult to form the 3D image 19 on a spatially consecutive location in a viewing region by using only the lens portion 14. In detail, all locations (points) of the viewing region do not satisfy a diffraction condition of the lens portion 14, and locations that satisfy the diffraction condition of the lens portion 14 in the viewing region exist discontinuously. Accordingly, when only the lens portion 14 is used without using the z-scan hologram, the 3D image may be seen at locations that are separated from each other and satisfy the diffraction condition of the lens portion 14. In order to view the 3D image 19 between the locations that satisfy the diffraction condition of the lens portion 14, that is, when only the lens portion 14 is used, the z-scan hologram is required to view the 3D image 19 at a location in the viewing region where the 3D image 19 may not be seen. From this point of view, a macroscopic focus control with respect to the 3D image 19 is achieved by the lens portion 14 and a microscopic focus control (for example, a focus control in a region between the macroscopic focus regions that satisfy the diffraction condition) is achieved by using the z-scan hologram.

The panel portion 16 displays an interference pattern that includes information about the 3D image 19. The interference pattern may be displayed by receiving a control signal (for example, an encoding signal) corresponding to an overlapped hologram provided from the hologram supply portion 18 or a hologram supplier and operating the panel portion 16. That is, the panel portion 16 is configured to display an interference pattern corresponding to the overlapped hologram by receiving and processing the control signal corresponding to the overlapped hologram from the hologram supply portion 18. The panel portion 16 may include a spatial light modulator (SLM) panel. The SLM panel included in the panel portion 16 may be, for example, a phase SLM panel, an amplitude SLM panel, or a complex SLM panel that includes both the phase SLM panel and the amplitude SLM panel. When the panel portion 16 includes a complex SLM panel, a main CGH formed in the hologram supply portion 18 may be supplied to the panel portion 16 without encoding.

Figure 2:
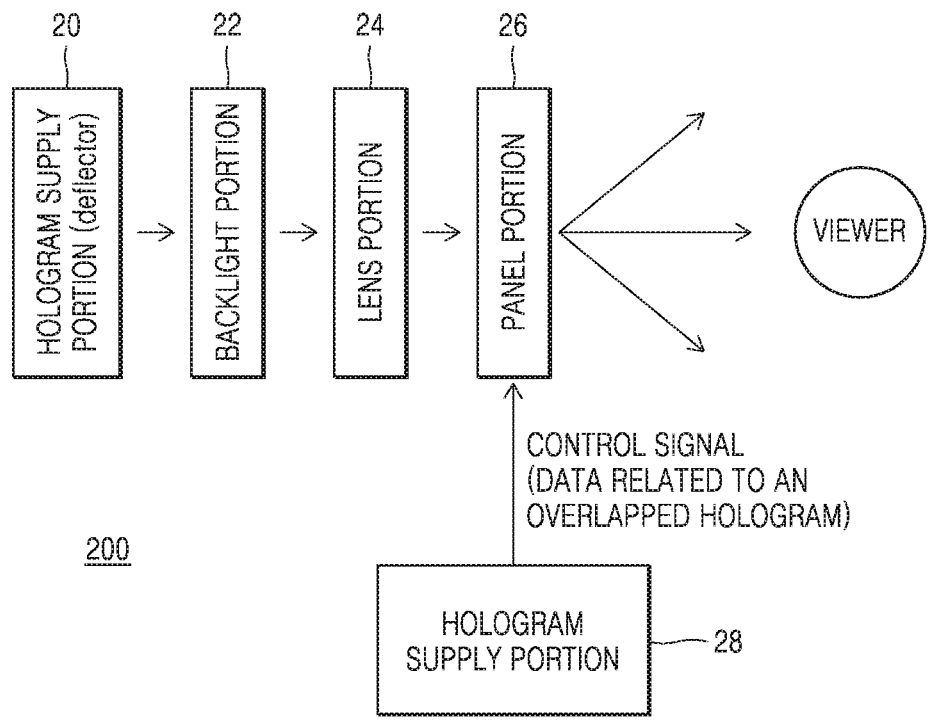

FIG. 2 shows a holographic display 200 according to another example embodiment.

Referring to FIG. 2, the holographic display 200 includes a deflector 20, a backlight portion 22, a lens portion 24, and a panel portion 26. The holographic display 200 may further include a hologram supply portion 28. The deflector 20 may be arranged in a farthest location from a viewer. The panel portion 26 may be arranged at a nearest location from the viewer. The backlight portion 22 and the lens portion 24 may be arranged between the deflector 20 and the panel portion 26. The backlight portion 22 is arranged between the deflector 20 and the lens portion 24. The deflector 20, the backlight portion 22, the lens portion 24, and the panel portion 26 may be arranged on the same optical axis. Configurations and performances of each of the deflector 20, the backlight portion 22, the lens portion 24, the panel portion 26, and the hologram supply portion 28 may be the same as those of the deflector 12, the backlight portion 10, the lens portion 14, the panel portion 16, and the hologram supply portion 18 of the holographic display 100 of FIG. 1.

FIG. 3 is a holographic display 300 according to another example exemplary embodiment.

Referring to FIG. 3, the holographic display 300 includes a backlight portion 30, a lens portion 32, a deflector 34, and a panel portion 36. The holographic display 300 may further include a hologram supply portion 38. The backlight portion 30 is arranged at a location farther away from a viewer than the lens portion 32, the deflector 34, and the panel portion 36. The panel portion 36 is arranged at a location closer to the viewer than the backlight portion 30, the lens portion 32, and the deflector 34. The lens portion 32, the deflector 34, and the panel portion 36 are sequentially arranged from the backlight portion 30 along an optical axis in a direction towards the viewer. The deflector 34 is arranged between the lens portion 32 and the panel portion 36. Configurations and performances of each of the backlight portion 30, the lens portion 32, the deflector 34, the panel portion 36, and the hologram supply portion 38 of the holographic display 300 may be the same as those of the deflector 12, the backlight portion 10, the lens portion 14, the panel portion 16, and the hologram supply portion 18 of the holographic display 100 of FIG. 1.

FIG. 4 is a holographic display 400 according to another exemplary embodiment.

Referring to FIG. 4, the holographic display 400 includes a backlight portion 40, a lens portion 42, a panel portion 44, and a deflector 46. The holographic display 400 may further include a hologram supply portion 48. The backlight portion 40 is arranged at a location farther than the lens portion 42, the deflector 46, and the panel portion 44. The deflector 46 is arranged at a location closer to the viewer than the backlight portion 40, the lens portion 42, and the panel portion 44. The lens portion 42, the panel portion 44, and the deflector 46 are sequentially arranged from the backlight portion 40 along an optical axis towards the viewer. The deflector 46 is arranged between the panel portion 44 and the viewer. Configurations and performances of each of the deflector 46, the backlight portion 40, the lens portion 42, the panel portion 36, and the hologram supply portion 48 of the holographic display 400 may be the same as those of the deflector 12, the backlight portion 10, the lens portion 14, the panel portion 16, and the hologram supply portion 18 of the holographic display 100 of FIG. 1.

The deflectors 12, 20, 34, and 46 of the holographic displays 100, 200, 300, and 400 described with reference to FIGS. 1, 2, 3, and 4, respectively, may control a reproducing or displaying direction of an image when a hologram image is reproduced or displayed. The deflectors 12, 20, 34, and 46 may include a mono-deflector that controls a reproduction direction of an image to be reproduced in a left-and-right direction and/or an up-and-down direction by performing in left-and-right deflection and/or an up-and-down deflection with respect to incident light. Also, the deflectors 12, 20, 34, and 46 may include a plurality of deflectors arranged in each of deflection directions. As an example, FIG. 5 shows a case in which the deflector 12 of FIG. 1 has a plurality of deflectors.

Figure 5:
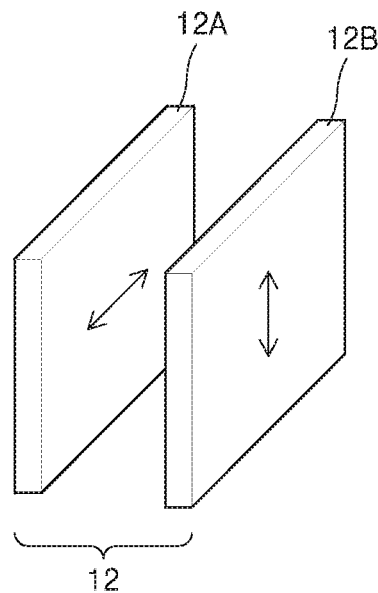
FIG. 5 is a perspective view illustrating a configuration of a deflector of the holographic displays of FIGS. 1 through 4, according to an example embodiment.

Referring to FIG. 5, the deflector 12 includes a first deflector 12A and a second deflector 12B that are arranged in parallel to each other along an optical axis. For example, the first deflector 12A may control a reproduction direction of a reproducing image in a left-and-right direction by deflecting incident light in the left-and-right direction, and the second deflector 12B may control the direction of a reproducing image in an up-and-down direction by deflecting incident light in the up-and-down direction. The roles of the first and second deflectors 12A and 12B may be reversed. The configuration of the deflector 12 depicted in FIG. 5 may be applied to the deflectors 20, 34, and 46 of FIGS. 2, 3, and 4, respectively.

Figure 6:
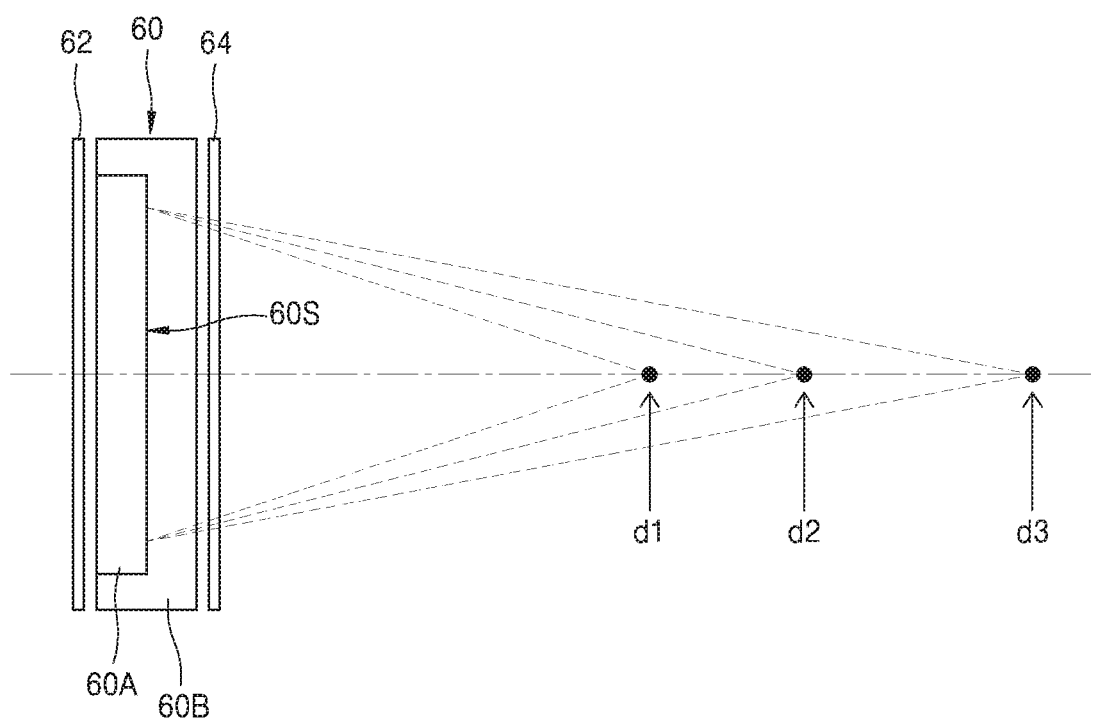
FIG. 6 is a cross-sectional view showing an example of variable focuses of lens portions included in the holographic displays of FIGS. 1 through 4, according to example embodiments.

FIG. 6 is a cross-sectional view showing an example of variable focus lenses included in the lens portions 14, 24, 32, and 42 of the holographic displays 100, 200, 300, and 400.

Referring to FIG. 6, a variable focus lens includes a lens layer 60 and first and second transparent electrode plates 62 and 64. The lens layer 60 is arranged between the first and second transparent electrode plates 62 and 64. The lens layer 60 may include a Fresnel lens 60A and a liquid crystal layer 60B covering the Fresnel lens 60A. The Fresnel lens 60A is well known in the art, and thus, for convenience of drawing, the Fresnel lens 60A is simply drawn. All of a light emission surface 60S of the Fresnel lens 60A is covered by the liquid crystal layer 60B. Light emitted from the Fresnel lens 60A is emitted through the liquid crystal layer 60B. The refractive index of the liquid crystal layer 60B varies according to the orientation direction of liquid crystals of the liquid crystal layer 60B. The orientation direction of the liquid crystal of the liquid crystal layer 60B may be controlled by controlling a voltage applied to the first and second transparent electrode plates 62 and 64. Accordingly, a refraction angle of light emitted through the Fresnel lens 60A may be controlled by controlling a voltage applied to the first and second transparent electrode plates 62 and 64. A diffraction phenomenon occurs due to structural characteristics of the Fresnel lens 60A. Accordingly, light emitted from the Fresnel lens 60A is diffracted light, and a refraction angle of the diffracted light may be controlled by controlling a voltage applied to the first and second transparent electrode plates 62 and 64. Light emitted from the Fresnel lens 60A is diffracted light. Accordingly, light emitted from the lens layer 60 may be focused on a location that satisfies a diffraction condition. That is, a focus of light emitted from the lens layer 60 is a location that satisfies the diffraction condition. Although the refraction index of the liquid crystal layer 60B is controllable, the diffraction condition should be satisfied, and thus, the control of a focus or a focal distance of light emitted from the lens layer 60 is discontinuously performed. For example, assuming that a focus of light first emitted from the lens layer 60 is formed on a first location d1 that satisfies the diffraction condition, when the focus is moved to a location farther than the first location d1 by controlling the focus of the lens layer 60 by applying a voltage to the first and second transparent electrode plates 62 and 64, the light may be focused on a second location d2 or a third location d3 that satisfies the diffraction condition. That is, the next focus may be on the second location d2 or the third location d3. The first, second, and third locations d1, d2, and d3 are locations that satisfy the diffraction condition, and are separated from each other. Viewers who are located at the first through third locations d1 through d3 may view a 3D image recorded in a main CGH regardless of the z-scan hologram. However, locations between the first, second, and third locations d1, d2, and d3 do not satisfy the diffraction condition. Therefore, in order to view the 3D image recorded in the main CGH in the locations between the first, second, and third locations d1, d2 and d3, the z-scan hologram should overlap the main CGH. When the z-scan hologram overlaps the main CGH, a location where the focus is formed may be moved into the locations between the first through third locations d1 through d3 that satisfy the diffraction condition.

Figure 7:
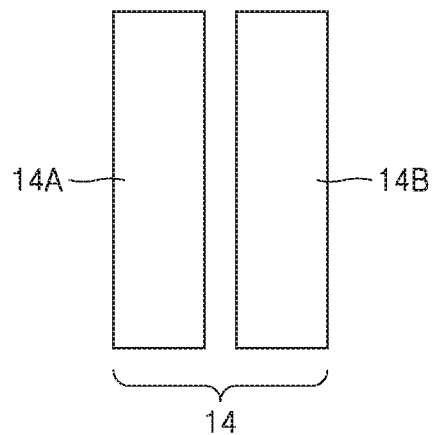
FIG. 7 is a cross-sectional view illustrating a configuration of a lens portion of the holographic display of FIG. 1, according to an example embodiment.

The lens portion 14 of FIG. 1 may include a variable focus lens 14A and a non-variable focus lens 14B as depicted in FIG. 7. The variable focus lens 14A and the non-variable focus lens 14B may contact each other. The variable focus lens 14A and the non-variable focus lens 14B may be spaced apart from each other. The non-variable focus lens 14B may be a lens with a fixed focal distance. The non-variable focus lens 14B may be a mono-lens. The non-variable focus lens 14B may be an optical lens system including a plurality of lenses. The configuration of the lens portion 14 of FIG. 7 may be applied to the lens portions 24, 32, and 42 of FIGS. 2, 3, and 4, respectively.

An operating method of a holographic display according to an exemplary embodiment will be described with reference to FIG. 8.

Figure 8:
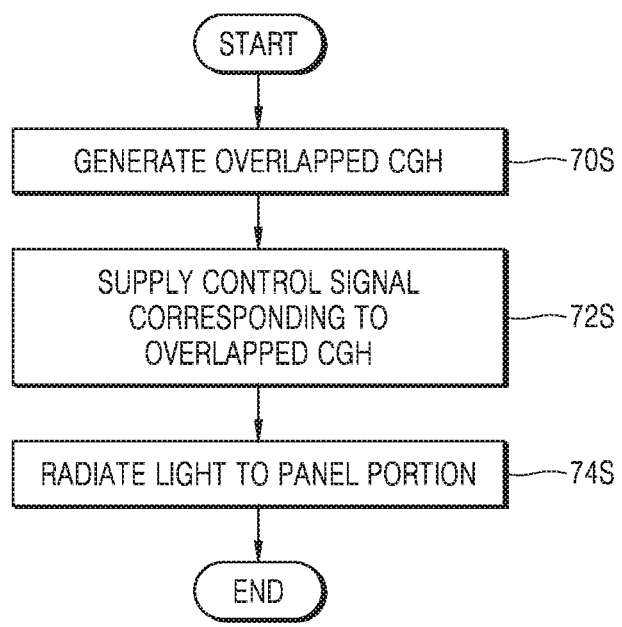
FIG. 8 is a flowchart of a method of operating the holographic display according to an example embodiment.

Referring to FIGS. 1 and 8, the operating method of the holographic display includes generating an overlapped CGH in operation 70S, supplying a control signal corresponding to the overlapped CGH in operation 72S, and radiating light to the panel portion 16 in operation 74S.

The generating of the overlapped CGH in operation 70S includes overlapping a main CGH and a z-scan hologram. Information with respect to a 3D image to be viewed by a viewer through the panel portion 16 is recorded in the main CGH. The main CGH may be a complex CGH. The generation and overlapping of the main CGH and the z-scan hologram may be performed in the hologram supply portion 18. The main CGH may be formed by using a method widely used in the art.

The z-scan hologram may be formed by using, for example, eye tracking as follows.

1: Find a location of eyes of a viewer.

2: Calculate a focal distance from the lens portion 14 that includes a variable focus lens to the eyes of the viewer.

3: Control a focus of the variable focus lens so that the controlled focus is the nearest focus to the calculated focal distance within a control range of the variable focus lens of the lens portion 14.

4: Calculate an error with respect to a focal distance between the calculated focal distance and the controlled focus of the variable focus lens.

5: Calculate a focal distance of a lens (also referred to as a compensation lens) that may compensate for the calculated error.

6: Calculate a hologram corresponding to the compensation lens by using an equation for calculating a complex hologram.

These processes may be performed in real-time. Accordingly, the z-scan hologram that is matched to a location of a viewer may be generated in real time.

The z-scan hologram may be basically a hologram that expresses a phase of the lens portion 14, and may perform a role of compensating the location of a focus or a focal distance of a lens. That is, the variable focus lens included in the lens portion 14 may show a diffraction phenomenon according to structural characteristics thereof. Thus, as described with reference to FIG. 6, the location where a focus of the variable focus lens is formed is discontinuously controlled. Accordingly, when a main CGH is only supplied to the panel portion 16 without a z-scan hologram, a 3D image of an object recorded in a CGH may be viewed in a location that satisfies the diffraction condition of the variable focus lens, that is, in a location where the focus of the variable focus lens is formed in a viewing region.

The z-scan hologram functions as a compensation lens with respect to the variable focus lens. Accordingly, since the main CGH overlaps the z-scan hologram, the 3D image recorded in the main CGH may be viewed in a location between two adjacent locations that satisfy the diffraction condition of the variable focus lens. In detail, the 3D image recorded in the main CGH may be viewed on a location that does not satisfy the diffraction condition of the variable focus lens. As it may be perceived from the process of forming the z-scan hologram, the z-scan hologram may be formed in real time through eye tracking with respect to a viewer. Thus, a location where the 3D image is formed (or in a region that does not satisfy the diffraction condition) between two adjacent locations that satisfy the diffraction condition of the variable focus lens may be controlled in real-time.

As a result, since the z-scan hologram overlaps the main CGH, a discontinuity with respect to a location where the 3D image recorded in the main CGH is viewed in a viewing region may be mitigated or prevented. In other words, since the z-scan hologram overlaps the main CGH, the 3D image may be viewed in any location in a given viewing region.

The process of supplying a control signal corresponding to the overlapped CGH in operation 72S may be performed in the hologram supply portion 18. A CGH processor 18A included in the hologram supply portion 18 generates a control signal, that is, a data signal corresponding to the overlapped CGH by performing an appropriate signal processing with respect to the overlapped CGH, and applies the control signal to the panel portion 16. The signal processing with respect to the overlapped CGH may include encoding. When the panel portion 16 includes a complex SLM, the encoding may not be necessary.

A process of radiating light to the panel portion 16 in operation 74S may be performed as follows.

The panel portion 16 may display an interference pattern corresponding to the overlapped CGH by receiving a control signal given from the hologram supply portion 18. In this state, when coherent light as a reference light is radiated to the panel portion 16 from the backlight portion 10, the 3D image is formed in a space where a viewer is located in front of the viewer. The 3D image formed in this manner is a 3D image with respect to an object recorded in the main CGH. The radiation of light to the panel portion 16 and the application of a control signal to the panel portion 16 may be simultaneously performed. In detail, the time when a control signal corresponding to the overlapped CGH from the hologram supply portion 18 is applied to the panel portion 16 and the time when light is radiated from the backlight portion 10 to the panel portion 16 may be synchronized with each other.

As described above, in the holographic display and the operating method of the holographic display, a panel portion is used to display an interference pattern with respect to an overlapped hologram. The overlapped hologram includes a main CGH in which a 3D image to be displayed is recorded and a z-scan hologram that moves the 3D image between focuses that satisfy a diffraction condition so that the 3D image may be viewed in a region that does not satisfy the diffraction condition of a variable focus lens. The holographic display according to the current exemplary embodiment may further include a hologram supply portion that supplies the overlapped hologram to the panel portion. The holographic display includes the panel portion, and thus, the 3D image may be viewed at a location that does not satisfy a diffraction condition of the variable focus lens in addition to a location that satisfies the diffraction condition in a viewing region. In detail, when the holographic display according to the current exemplary embodiment is used, a discontinuity in displaying of the 3D image in the viewing region may be mitigated or prevented, and thus, the 3D image may be viewed at any location in the viewing region.

Also, the holographic display according to the current exemplary embodiment includes a deflector arranged between a backlight portion and a panel portion. Thus, the efficiency of the backlight portion may be increased, that is, an amount of light to be supplied to the viewing region is increased. Therefore, a 3D image with increased brightness may be viewed.

While one or more exemplary embodiments have been described with reference to the figures, it will be understood by those of ordinary skill in the art that various changes in form and details may be made therein without departing from the spirit and scope as defined by the following claims.

What is claimed is:

1. A holographic display comprising:
a backlight portion configured to emit light for displaying an image recorded with a hologram;
a deflector configured to control a direction at which the image is displayed;
a diffractive lens portion configured to control a focal depth where the image is formed to match a focal depth from among a plurality of focal depths that satisfy a diffraction condition of the diffractive lens portion; and
a panel portion configured to display an interference pattern with respect to an overlapped hologram, the interference pattern comprising a first interference pattern corresponding to the image recorded with the hologram and a second interference pattern corresponding to a z-scan hologram image that adjusts in real time a focal depth of the image recorded with the hologram to a position between a first focal depth that satisfies the diffraction condition of the diffractive lens portion and a second focal depth that satisfies the diffraction condition of the diffractive lens portion,
wherein the position between the first focal depth and the second focal depth has a third focal depth that does not satisfy the diffraction condition of the diffractive lens portion,
wherein the diffractive lens portion comprises a variable focus lens having a refractive index which is electrically controlled, and
wherein the variable focus lens comprises a single Fresnel lens having a single diffractive optical power and a liquid crystal layer covering a light emission surface of the Fresnel lens.

2. The holographic display of claim 1, further comprising a hologram supply portion configured to supply a control signal to the panel portion so that the panel portion displays the interference pattern.

3. The holographic display of claim 1, wherein the deflector comprises:
a first deflector configured to deflect the image in a horizontal direction; and
a second deflector configured to deflect the image in a vertical direction.

4. The holographic display of claim 1, wherein the deflector comprises a mono-deflector configured to deflect the image in a vertical direction and a horizontal direction.

5. The holographic display of claim 1, further comprising a non-variable focus lens provided adjacent to the variable focus lens on an optical path.

6. The holographic display of claim 1, wherein the deflector is provided in one of a first location between the backlight portion and the panel portion, a second location behind the backlight portion, and a third location between the panel portion and a person viewing the image.

7. A holographic display comprising:
a backlight portion configured to emit light for displaying an image recorded with a hologram;
a deflector configured to control a direction at which the image is displayed;
a diffractive lens portion configured to control a focal depth where the image is formed to match a focal depth from among a plurality of focal depths that satisfy a diffraction condition of the diffractive lens portion; and
a panel portion configured to display an interference pattern with respect to an overlapped hologram, the interference pattern comprising a first interference pattern corresponding to the image recorded with the hologram and a second interference pattern corresponding to a z-scan hologram image that adjusts in real time a focal depth of the image recorded with the hologram to a position between a first focal depth that satisfies the diffraction condition of the diffractive lens portion and a second focal depth that satisfies the diffraction condition of the diffractive lens portion,
wherein the position between the first focal depth and the second focal depth has a third focal depth that does not satisfy the diffraction condition of the diffractive lens portion, and
wherein the panel portion comprises a spatial light modulator (SLM).

8. The holographic display of claim 7, wherein the SLM comprises one of a phase SLM, an amplitude SLM, and a complex SLM.

9. A holographic display comprising:
a backlight portion configured to emit light for displaying an image recorded with a hologram;
a deflector configured to control a direction at which the image is displayed;
a diffractive lens portion configured to control a focal depth where the image is formed to match a focal depth from among a plurality of focal depths that satisfy a diffraction condition of the diffractive lens portion; and
a panel portion configured to display an interference pattern with respect to an overlapped hologram, the interference pattern comprising a first interference pattern corresponding to the image recorded with the hologram and a second interference pattern corresponding to a z-scan hologram image that adjusts in real time a focal depth of the image recorded with the hologram to a position between a first focal depth that satisfies the diffraction condition of the diffractive lens portion and a second focal depth that satisfies the diffraction condition of the diffractive lens portion,
wherein the position between the first focal depth and the second focal depth has a third focal depth that does not satisfy the diffraction condition of the diffractive lens portion, and
wherein the z-scan hologram image is configured to move the image to a location between regions that satisfy the diffraction condition.

10. An operating method of a holographic display, the operating method comprising:

generating an overlapped computer-generated hologram (CGH);

supplying an interference pattern corresponding to the overlapped CGH to a panel portion;

radiating light to the panel portion such that the overlapped CGH and the light combine to form a 3D image; and controlling a focal depth of a diffractive lens portion of the holographic display to match a focal depth from among a plurality of focal depths that satisfy a diffraction condition of the diffractive lens portion, wherein the interference pattern comprises a first interference pattern corresponding to the 3D image and a second interference pattern corresponding to a z-scan hologram image that adjusts in real time a focal depth of the 3D image to a position between a first focal depth that satisfies the diffraction condition of the diffractive lens portion and a second focal depth that satisfies the diffraction condition of the diffractive lens portion, and wherein the position between the first focal depth and the second focal depth has a third focal depth that does not satisfy the diffraction condition of the diffractive lens portion.

11. The operating method of claim 10, wherein the z-scan hologram image is configured to move the 3D image to a region that does not satisfy the diffraction condition.

12. The operating method of claim 11, wherein the generating the overlapped CGH comprises:

finding a location of eyes of a person viewing the 3D image;

calculating a focal distance from the diffractive lens portion of the holographic display to the eyes of the person;

controlling the focal depth of the diffractive lens portion so that the controlled focal depth is nearest to the calculated focal distance within a focus control range of the diffractive lens portion;

calculating a focus error between the calculated focal distance and the controlled focal depth of the diffractive lens portion;

calculating a focal distance of a compensation lens configured to compensate for the calculated error; and calculating a hologram corresponding to the compensation lens by using an equation for calculating a complex hologram.

13. The operating method of claim 10, wherein the supplying the overlapped CGH to the panel portion comprises:

generating a control signal by processing a signal for the overlapped CGH; and supplying the control signal to the panel portion.

14. The operating method of claim 13, wherein the generating the control signal by processing the signal for the overlapped CGH comprises encoding the overlapped CGH.

15. The operating method of claim 10, wherein the panel portion comprises a spatial light modulator (SLM).

16. The operating method of claim 15, wherein the SLM comprises one of a phase SLM, an amplitude SLM, and a complex SLM.

17. The operating method of claim 10, wherein the radiating the light to the panel portion comprises deflecting a travelling direction of the light in a certain direction before the radiating the light to the panel portion.

18. The operating method of claim 10, wherein the supplying the interference pattern comprises supplying the first interference pattern simultaneously with the second interference pattern.

* * * * *